(12) United States Patent  
Kelley, Jr.

(10) Patent No.: US 7,425,183 B2
(45) Date of Patent: Sep. 16, 2008

(54) TRANSFER CASE FOR REGENERATIVE HYDRAULIC DRIVE

(75) Inventor: William R. Kelley, Jr., Novi, MI (US)

(73) Assignee: Borg Warner, Inc., Auburn Hills, MI (US)

( * ) Notice: Subject to any disclaimer, the term of this patent is extended or adjusted under 35 U.S.C. 154(b) by 279 days.

(21) Appl. No.: 11/253,324

(22) Filed: Oct. 19, 2005

(65) Prior Publication Data

US 2007/0087888 A1 Apr. 19, 2007

(51) Int. Cl.
*F16H 37/02* (2006.01)

(52) U.S. Cl. ...................... 475/204; 475/213
(58) Field of Classification Search .............. 475/5, 475/204, 210, 213
See application file for complete search history.

(56) References Cited

U.S. PATENT DOCUMENTS

| | | | |
|---|---|---|---|
| 4,392,394 A * | 7/1983 | Hofbauer et al. ............. 475/204 |
| 4,592,454 A | 6/1986 | Michel |
| 5,407,024 A | 4/1995 | Watson et al. |
| 5,890,982 A | 4/1999 | Meyerle |
| 6,101,897 A | 8/2000 | Showalter |
| 6,106,428 A * | 8/2000 | Koneda et al. .............. 475/210 |
| 6,155,395 A | 12/2000 | Braford, Jr. |
| 6,269,895 B1 * | 8/2001 | Tanuguchi et al. ......... 180/65.2 |
| 6,830,142 B2 | 12/2004 | Weilant |
| 6,935,476 B2 * | 8/2005 | Kurmaniak .................. 192/35 |
| 7,214,156 B2 * | 5/2007 | Oliver .......................... 475/8 |
| 7,309,067 B2 * | 12/2007 | Kita ........................... 475/210 |
| 2004/0099454 A1 | 5/2004 | Hughes |

FOREIGN PATENT DOCUMENTS

| | | |
|---|---|---|
| EP | 0366087 A2 | 5/1990 |
| FR | 2613016 A1 | 9/1988 |
| JP | 04282052 A * | 10/1992 |

* cited by examiner

*Primary Examiner*—Ha D. Ho
(74) *Attorney, Agent, or Firm*—Brinks Hofer Gilson & Lione

(57) ABSTRACT

A regenerative drive system for heavy duty vehicles such as truck tractors having a conventional internal combustion engine and transmission includes a regenerative hydraulic motor and a transfer case. The transfer case has a chain drive coupling the output of the hydraulic motor to the input of a planetary gear speed reduction assembly. The output of the planetary gear assembly is provided to a modulating friction clutch pack which selectively couples the output of the planetary gear assembly to the transmission output and drives the differential and rear vehicle wheels.

15 Claims, 3 Drawing Sheets

TRANSFER CASE FOR REGENERATIVE HYDRAULIC DRIVE

TECHNICAL FIELD

The invention relates generally to a unique transfer case for use with a regenerative hydraulic drive and more specifically to a transfer case having a planetary gear speed reduction assembly and a friction clutch pack for use with an auxiliary regenerative hydraulic motor.

BACKGROUND OF THE INVENTION

Rapid vehicle acceleration and fuel conservation are two mutually exclusive motor vehicle operating parameters. The steady increase in the cost of fuel has pushed the equation balance point toward fuel conservation in recent time. The desire to reasonably accelerate both passenger cars and trucks, however, has not disappeared. Those conversant with energy conservation acknowledge the most significant fuel consumption or waste occurs when the vehicle is braked to slow or stop it. The kinetic energy carried by the vehicle which arose by virtue of fuel consumption is dissipated and wasted as it is converted to heat in the brakes of the vehicle. This loss of energy and accompanying increase in fuel consumption has recently been acknowledged and addressed in that class of vehicles known as hybrid vehicles. In them, various regenerative systems attempt to recover the kinetic energy of the vehicle as it is braked by utilizing electric generators and storage batteries. The energy may then be used by an electric motor during subsequent vehicle accelerations.

Other energy storage systems exist. For example, a regenerative pump may pressurize hydraulic fluid which is stored in a reservoir; the stored hydraulic fluid and energy being utilized to drive a hydraulic motor during vehicle acceleration. Mechanically integrating such a system into a large vehicle such as a truck tractor involves many engineering challenges. The present invention is directed to such a system.

SUMMARY

A regenerative drive system for heavy duty vehicles such as truck tractors having a conventional internal combustion engine and transmission includes a regenerative hydraulic motor and a transfer case. The transfer case has a chain drive coupling the output of the hydraulic motor to the input of a planetary gear speed reduction assembly. The output of the planetary gear assembly is provided to a modulating friction clutch pack which selectively couples the output of the planetary gear assembly to the transmission output and drives the differential and rear vehicle wheels.

Thus it is an object of the present invention to provide a regenerative system for a truck having a hydraulic motor and transfer case containing a chain drive, planetary gear set and friction clutch.

It is a further object of the present invention to provide a transfer case for use with a regenerative drive system in a truck tractor.

It is a still further object of the present invention to provide a transfer case for a regenerative drive system having a chain drive, planetary gear speed reduction assembly and modulating friction clutch pack.

It is a still further object of the present invention to provide a regenerative drive system for a truck tractor having a hydraulic motor and planetary gear assembly which decreases the motor speed output and increases its torque.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
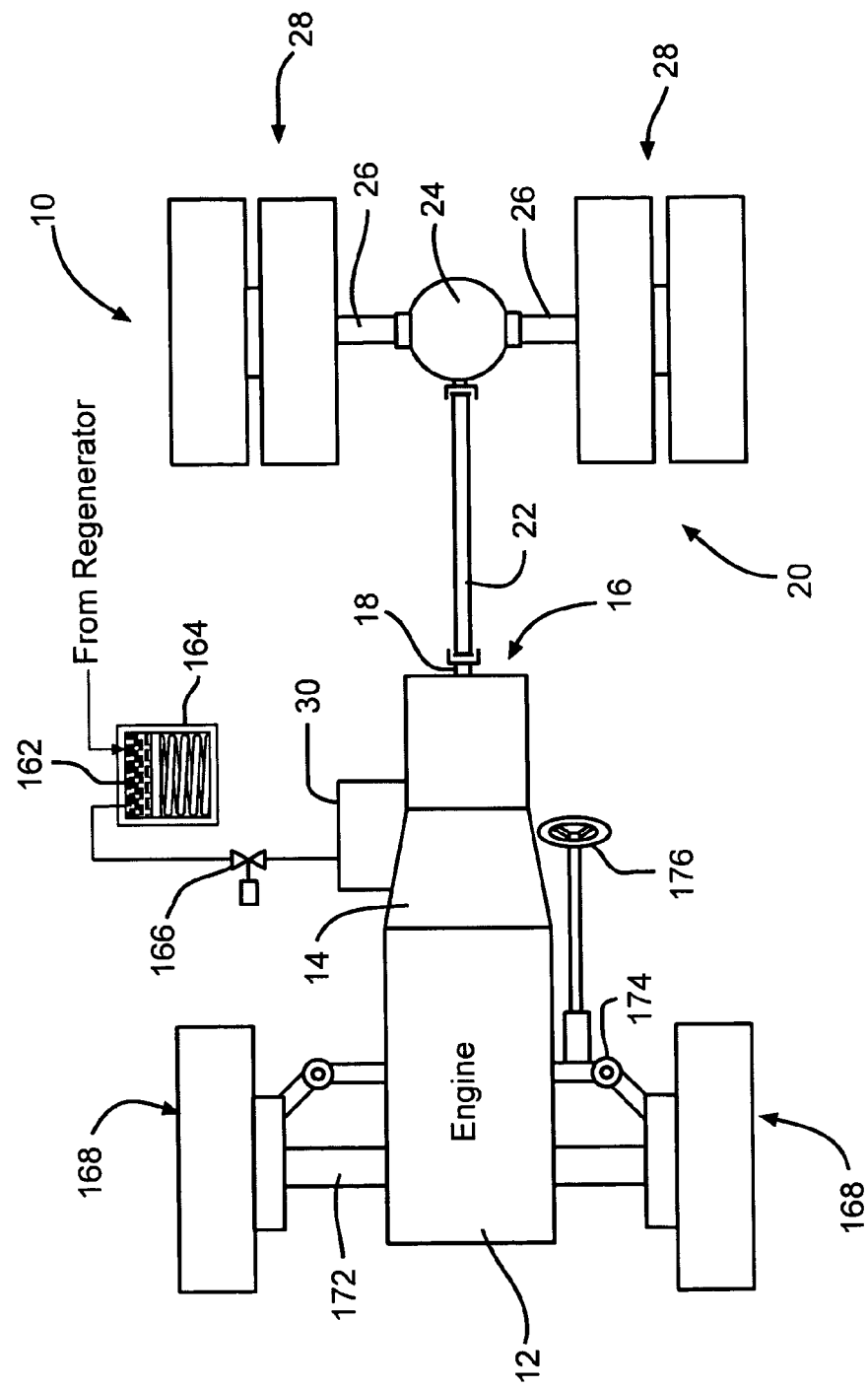
FIG. 1 is a diagrammatic, plan view of a motor vehicle such as a truck tractor having a regenerative drive system incorporating the present invention.
Figure 2:
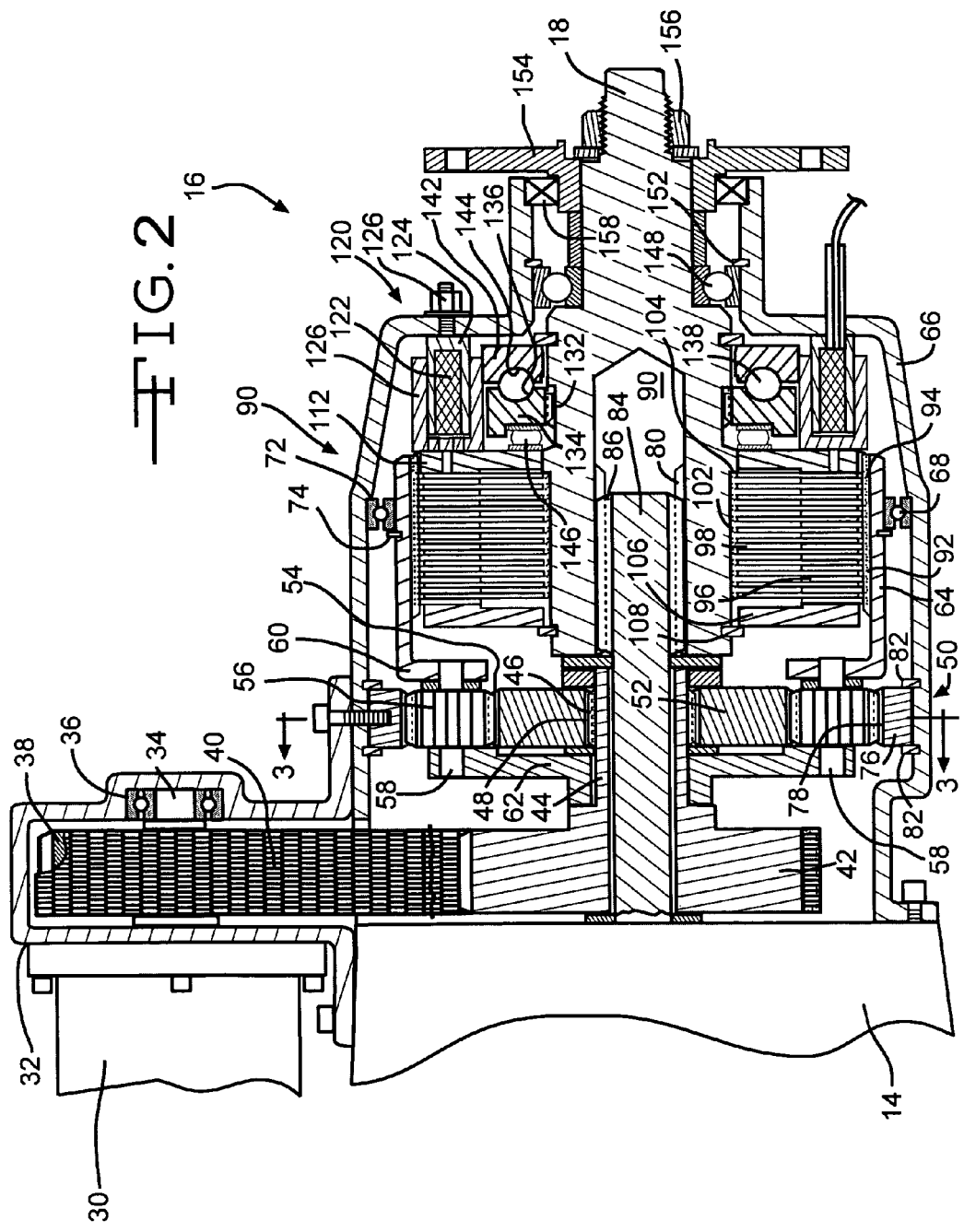
FIG. 2 is an enlarged, fragmentary, sectional view of a transfer case according to the present invention for use with a regenerative drive system.
Figure 3:
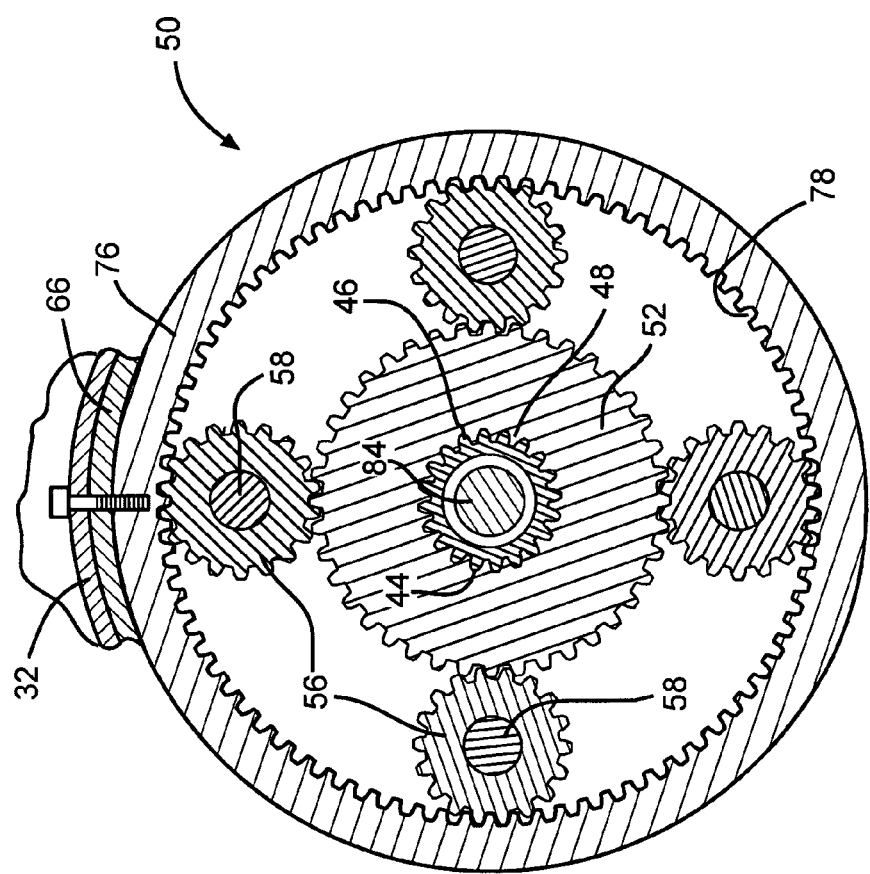
FIG. 3 is a full, sectional view of the planetary gear assembly of a transfer case according to the present invention for use with a regenerative drive system taken along line 3-3 of FIG. 2.

Referring now to FIGS. 1 and 2, a diagrammatic, plan view of a driveline assembly of a heavy duty truck such as a semi-truck tractor is illustrated and generally designated as the reference number 10. The driveline assembly 10 includes a prime mover 12 such as an internal combustion gas or Diesel engine. The prime mover 12 is directly coupled to and drives a multiple speed automated mechanical transmission (AMT) or manual transmission 14. In turn, the output of the transmission 14 is provided to a transfer case assembly 16. The transfer case assembly 16 is not a conventional transfer case for vehicles such as passenger cars and sport utility vehicles having one input and two outputs. Rather, the transfer case 16 of the present invention includes two inputs and one output which drives only the rear wheels of the driveline assembly 10. The term "transfer case" was chosen to apply to the present device inasmuch as: 1) it is operatively disposed at the output of the vehicle transmission as a conventional transfer case is, 2) it directly drives the rear wheels of the vehicle as a transfer case generally does, 3) it includes a clutch which selectively transfers torque as occurs in a conventional transfer case and, finally, 4) it includes a chain drive as most conventional transfer cases do.

As noted, the transfer case assembly 16 includes an output shaft 18 which directly drives a rear driveline assembly 20. The rear driveline assembly 20 includes a rear propshaft 22 which is coupled to and drives a rear differential 24. The rear differential 24 may be a conventional open, cage-type differential or a limited slip differential. In either event, the rear differential 24 drives a pair of rear axles 26 which in turn provide drive energy to rear left and right tire and wheel assemblies 28. The rear tire and wheel assemblies 28 may be tandem wheel sets as illustrated or single tire and wheel assemblies 28 depending upon the associated vehicle and driveline assembly 10. The driveline assembly 10 also includes a hydraulic launch motor 30.

Referring now to FIG. 2, the hydraulic launch motor 30 includes a housing 32 which is secured to the transmission 14 and the transfer case assembly 16. The hydraulic launch motor 30 is preferably a vane or similar relatively high torque output hydraulic motor. Preferably, the hydraulic launch motor is capable of producing approximately 500 to 1500 pound feet of torque. The hydraulic launch motor 30 includes an output shaft 34 which is supported in the housing 32 by an anti-friction bearing such as a ball bearing assembly 36. Secured to the output shaft 34 is a first chain drive sprocket 38.

The chain drive sprocket 38 receives and engages a continuous multi-link chain 40 which also is received upon, engages and drives a second driven chain sprocket 42. Preferably, the drive ratio between the main drive sprocket 38 and the driven chain sprocket 42 is 1:1 although this ratio may be increased or decreased if desired. The driven chain sprocket 42 includes an axially extending tubular portion or quill 44 having a set of external or male splines or gear teeth 46 disposed thereon. The external or male splines 46 receive and engage internal or female splines or gear teeth 48 which are a component of a planetary gear speed reduction assembly 50.

The planetary gear speed reduction assembly 50 includes an input sun gear 52 containing the female splines or gear teeth 48 which therefore rotates with the quill 44 and the driven chain sprocket 42. The sun gear 52 includes gear teeth 54 about its periphery which engage a plurality of planet gears 56 freely rotatably disposed upon stub shafts 58 which are received within and secured to a planetary gear carrier 60. The planetary gear carrier 60 includes a circular end disk 62 which is journaled about the outside diameter of the quill 44 and an axially extending bell shaped housing 64 which is positioned within a housing 66 of the transfer case assembly 16 and freely rotatably supported therein by an anti-friction bearing such as a ball bearing assembly 68. The bell shaped housing 64 is maintained in its desired axial position by cooperation with a shoulder 72 in the housing 66 and a snap ring 74 which seats within a complementary groove in the housing 66.

A stationary ring gear 76 is also supported within the housing 66 of the transfer case assembly 16 and includes internal gear teeth 78 which are engaged by the plurality of planet gears 56. The ring gear 76 is maintained in an aligned position with the planet gears 56 by a pair of snap rings 82. Drive from the driven chain sprocket 42, through the sun gear 52, the planet gears 56 and out the planetary gear carrier 60 provides an approximately 3.1475 to 1 speed reduction and corresponding torque increase. This speed reduction ratio may be adjusted up or down to achieve suitable operation of the transfer case 16 and regenerative drive system. For example, ratios of 2.5 to 1 or lower or 3.75 to 1 or higher may be utilized.

The transmission 14 includes an output shaft 84 having a region of external or male splines or gear teeth 86 which engage complementarily configured internal or female splines or gear teeth 88 formed on the inside surface of a counterbore extending axially into the output shaft 18.

An electromagnetic friction clutch pack assembly 90 provides selective frictional coupling and torque transfer between the planetary gear carrier 60 and the output shaft 18. The inside surface of the axially extending bell shaped housing 64 of the planetary gear carrier 60 includes a region of female or internal splines or gear teeth 92. The internal splines or gear teeth 92 are engaged by complementarily configured male splines 94 extending from a first plurality of larger friction clutch plates 96. Interleaved with the first plurality of larger friction clutch plates 96 are a second plurality of smaller friction clutch plates 98. At least one surface of each of the friction clutch plates 96 and 98 includes suitable friction clutch facing material (not illustrated). The second plurality of smaller friction clutch plates 98 each includes a set of female or internal splines or gear teeth 102 which are complementary to and engage a set of external or male splines or gear teeth 104 extending along a region of the output shaft 18. At one end of the pack of interleaved clutch plates 96 and 98 is a circular clutch restraining disk 106 which is maintained in its axial position on the output shaft 18 by a snap ring 108. At the opposite end of the interleaved friction clutch plates 96 and 98 is an apply plate 112 which is splined to and rotates with the bell shaped housing 66.

Adjacent the apply plate 112 is an electromagnetic ball ramp actuator assembly 120. The electromagnetic ball ramp actuator assembly 120 includes an electromagnetic coil 122 disposed in an annular coil housing 124 which is secured to the housing 66 of the transfer case assembly 16 by a plurality of circumferentially spaced-apart threaded studs 126 and associated nuts, one of which is illustrated in FIG. 2. The annular coil housing 124 is surrounded by a soft iron rotor 126. A plurality of interengaging splines 132 couples as a first circular member 134 to the output shaft 18 for rotation therewith. On one face of the first circular member 134 are a plurality of arcuate ramped recesses 136 which each receive a load transferring member such as a ball bearing 138.

Disposed adjacent the first circular member 134 is a second circular member 142 having a like plurality of arcuate ramped recesses 144 which face the ramped recesses 136 on the first circular member 134. The second circular member 142 is secured for rotation with the soft iron rotor 126. If there is a rotational speed difference between the planet gear carrier 60 and the output shaft 18 and the electromagnetic coil 122 is energized, the speed difference and magnetic forces of attraction will cause the first and second circular members 134 and 142 to rotate relative to one another and cause the ball bearings 138 to roll toward the shallow portions of the arcuate recesses 136 and 144 thereby separating the first and second circular members 134 and 142 and compressing the interleaved plates 96 and 98 clutch. A thrust bearing 146 is disposed between the apply plate 112 and the first circular member 142 and allows free relative rotation therebetween. The output shaft 18 is supported by an anti-friction bearing assembly such as a ball bearing assembly 148. The ball bearing assembly 148 is maintained in position and maintains the output shaft 18 in axial position by virtue of a shoulder on the output shaft 18 and a snap ring 152. An output flange 154 may be retained upon the output shaft 18 by a nut 156. A suitable oil seal 158 disposed between a portion of the flange 154 and the housing 66 provides a fluid tight seal therebetween.

Referring again to FIG. 1, the hydraulic launch motor 30 is supplied with a controlled flow of pressurized hydraulic fluid 162 from a pressurized reservoir 164 through a modulating control valve 166. Pressurized hydraulic fluid is provided to and stored in the reservoir 164 from a regenerator or regenerative hydraulic pump (not illustrated). Hydraulic fluid exhausted by the hydraulic launch motor 30 is returned to a sump (also not illustrated).

The driveline assembly 10 also includes a pair of front tire and wheel assemblies 168 which are supported for pivotal movement at the ends of a front axle 172. A steering linkage 174 couples the pivotable front tire and wheel assemblies 168 and receives steering input from a steering wheel 176 to pivot the front tire and wheel assemblies 168 about a pair of substantially vertical, spaced-apart axes. The drivetrain assembly 10 may also include speed sensors associated with the tire and wheel assemblies 28 and 168, a throttle position sensor associated with the throttle pedal and a microprocessor (all not illustrated) which receives information regarding the vehicle speed and throttle position and controls the torque generated by the hydraulic launch motor 30 as well as engagement of the modulating clutch assembly 90 to control the quantity and duration of torque generated and applied by the hydraulic launch motor 30 to the rear driveline assembly 20 during acceleration of the motor vehicle.

With regard to operation of the regenerative hydraulic drive, it will be assumed that the reservoir 164 has been filled and pressurized from action of a regenerator or regenerative hydraulic pump driven by components of the vehicle drivetrain 10 during a previous coast down. Subsequently, the vehicle is commanded to accelerate by depression of the throttle pedal and such motion is read by the throttle position sensor and the resulting data is transmitted to the microprocessor. The microprocessor issues signals to both the modulating control valve 166 and the electromagnetic coil 122 of the friction clutch pack assembly 90 in accordance with predetermined software rules and algorithms thereby providing compressed hydraulic fluid 162 to the hydraulic launch motor 30 and engaging the electromagnetic clutch pack assembly 90 to the extent desired. When the vehicle has fully or substantially fully accelerated or the pressurized hydraulic fluid 162 has been exhausted from the reservoir 164, the control valve 166 may be commanded to close and the electromagnetic friction clutch pack assembly 90 disengaged by the microprocessor.

The foregoing disclosure is the best mode devised by the inventor for practicing this invention. It is apparent, however, that apparatus incorporating modifications and variations will be obvious to one skilled in the art transfer cases for regenerative drive systems. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A transfer case for a regenerative drive system comprising, in combination,
    a first chain sprocket,
    a second chain sprocket,
    a chain disposed about and engaging said sprockets,
    a shaft for receiving a transmission output and providing said output to a propshaft, said shaft being splined for receiving a complementarily splined transmission output shaft, a planetary gear assembly having a sun gear coupled to said second chain sprocket, a plurality of planet gears engaging said sun gear and disposed on a carrier and a stationary ring gear engaged by said planet gears,
    a friction clutch assembly operably disposed between said carrier and said shaft.

2. The transfer case of claim 1 further including a hydraulic motor having an output coupled to said first chain sprocket.

3. The transfer case of claim 1 further including a drive system having a prime mover, a transmission having an output coupled to said shaft and a hydraulic motor having an output coupled to said first chain sprocket.

4. The transfer case of claim 1 wherein said friction clutch assembly includes a friction clutch pack and an electromagnetic operator.

5. The transfer case of claim 4 wherein said electromagnetic operator includes an electromagnetic coil and a ball ramp actuator.

6. A transfer case for a regenerative drive system comprising, in combination,
    a first chain sprocket,
    a second chain sprocket,
    a chain disposed about and engaging said sprockets,
    a shaft for receiving a transmission output and providing said output to a propshaft, a planetary gear assembly having a sun gear coupled to said second chain sprocket, a plurality of planet gears engaging said sun gear and disposed on a carrier and a stationary ring gear engaged by said planet gears,
    a friction clutch assembly operably disposed between said carrier and said shaft, said friction clutch assembly further including a bell housing coupled to said carrier of said planetary gear assembly and wherein said friction clutch assembly includes a first plurality of clutch plates engaged by said bell housing for rotation therewith and a second plurality of clutch plates interleaved with said first plurality of clutch plates and engaged by said shaft for rotation therewith.

7. A transfer case for a regenerative drive system comprising, in combination,
    a shaft for receiving a transmission output and providing said output to a propshaft,
    a first chain sprocket,
    a second chain sprocket freely disposed about said shaft,
    a chain disposed about and engaging said sprockets,
    a planetary gear assembly having a sun gear freely disposed about said shaft and coupled to said second chain sprocket, a plurality of planet gears engaging said sun gear and disposed on a carrier and a stationary ring gear engaged by said planet gears,
    a friction clutch assembly operably disposed about said shaft and selectively engaging said carrier and said shaft.

8. The transfer case of claim 7 further including a housing and wherein said ring gear is secured to said housing.

9. The transfer case of claim 7 wherein said shaft includes a splined counterbore for receiving a complementarily splined output shaft of a transmission.

10. The transfer case of claim 7 further including a drive system having a prime mover, a transmission having an output coupled to said shaft and an auxiliary motor coupled to said first chain sprocket.

11. The transfer case of claim 7 wherein said chain sprockets have a drive ratio of 1:1 and said planetary gear assembly has a speed reduction ratio of between 2.5 and 3.75 to 1.

12. The transfer case of claim 7 further including a hydraulic motor having an output coupled to said first chain sprocket.

13. The transfer case of claim 7 wherein said friction clutch assembly includes a friction clutch pack and an electromagnetic operator.

14. The transfer case of claim 13 wherein said electromagnetic operator includes an electromagnetic coil and a ball ramp actuator.

15. The transfer case of claim 7 further including a drive system having a prime mover, a transmission having an output coupled to said shaft and a hydraulic motor having an output coupled to said first chain sprocket.

* * * * *